United States Patent
Sun et al.

(10) Patent No.: US 10,063,401 B2
(45) Date of Patent: Aug. 28, 2018

(54) COMMUNICATION METHOD AND APPARATUS BASED ON A FILTER BANK MULTI-CARRIER MODULATION

(71) Applicant: Samsung Electronics Co., Ltd., Suwon-si, Gyeonggi-do (KR)

(72) Inventors: Pengfei Sun, Beijing (CN); Bin Yu, Beijing (CN); Dalin Zhu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/000,698

(22) Filed: Jan. 19, 2016

(65) Prior Publication Data

US 2016/0211998 A1 Jul. 21, 2016

(30) Foreign Application Priority Data

Jan. 16, 2015 (CN) .......................... 2015 1 0023553
Dec. 22, 2015 (KR) ........................ 10-2015-0184281

(51) Int. Cl.
*H04L 27/28* (2006.01)
*H04L 27/26* (2006.01)
*H04L 5/00* (2006.01)

(52) U.S. Cl.
CPC ........ *H04L 27/264* (2013.01); *H04L 27/2649* (2013.01); *H04L 5/0048* (2013.01)

(58) Field of Classification Search
CPC .............................. H04L 27/264; H04L 27/26
USPC ................................................. 375/260, 259
See application file for complete search history.

(56) References Cited

U.S. PATENT DOCUMENTS

| | | | |
|---|---|---|---|
| 2012/0189036 A1* | 7/2012 | Bellanger | H04L 27/2631 375/146 |
| 2012/0243625 A1* | 9/2012 | Berg | H04L 25/022 375/260 |
| 2014/0233437 A1* | 8/2014 | Abdoli | H04L 5/0007 370/280 |

(Continued)

OTHER PUBLICATIONS

Siohan et al., "Analysis and Design of OFDM-OQAM Systems Based on Filter Bank Theory", IEEE Transactions on Signal Processing, vol. 50, No. 5, May 2002.

(Continued)

*Primary Examiner* — Helene Tayong
(74) *Attorney, Agent, or Firm* — Jefferson IP Law, LLP

(57) ABSTRACT

A method for transmitting signal based on a filter bank multi-carrier (FBMC) modulation, a method for receiving signal based on the FBMC modulation, and a corresponding transmitting device and receiving device are disclosed. The method includes preprocessing determined symbols in a data block, modulating the preprocessed data block with the FBMC modulation, truncating the modulated data block to remove a part or all of tailing data therefrom, and transmitting the truncated modulated data block, from which the part or all of tailing data has been removed, and the determined symbols are affected by the truncating of the modulated data block. The data block includes at least one symbol. The method relates to a pre-5th-Generation (5G) or 5G communication system to be provided for supporting higher data rates Beyond 4th-Generation (4G) communication system such as Long Term Evolution (LTE).

20 Claims, 15 Drawing Sheets

(56) References Cited

U.S. PATENT DOCUMENTS

| | | | | |
|---|---|---|---|---|
| 2014/0233664 A1* | 8/2014 | Abdoli | ................ | H04L 27/2698 375/261 |
| 2014/0348268 A1* | 11/2014 | Siohan | ................ | H04L 27/2633 375/298 |
| 2015/0063507 A1* | 3/2015 | Dore | ................ | H04L 25/03159 375/348 |
| 2015/0304144 A1* | 10/2015 | Siohan | ................ | H04L 27/2698 375/295 |
| 2015/0372843 A1* | 12/2015 | Bala | ................ | H04L 25/03834 375/295 |

OTHER PUBLICATIONS

"Working Document Towards a Preliminary Draft New Report ITU-R M.", Radiocommunication Study Groups, Oct. 21, 2014.
"Future Technology Trends of Terrestrial IMT Systems", ITU-R, Report ITU-R M.2320-0, Nov. 2014.
"IMT Vision—Framework and Overall Objectives of the Future Development of IMT for 2020 and Beyond", ITU-R, Recommendation ITU-R M.2083-0, Sep. 2015.

* cited by examiner

COMMUNICATION METHOD AND APPARATUS BASED ON A FILTER BANK MULTI-CARRIER MODULATION

CROSS-REFERENCE TO RELATED APPLICATION(S)

The application claims the benefit under 35 U.S.C. § 119(a) of a Chinese patent application filed on Jan. 16, 2015 in the State Intellectual Property Office and assigned Serial number 201510023553.3, and of a Korean patent application filed on Dec. 22, 2015 in the Korean Intellectual Property Office and assigned Serial number 10-2015-0184281, the entire disclosure of each of which is hereby incorporated by reference.

TECHNICAL FIELD

The present disclosure relates to a technical field of mobile communication. More particularly, the present disclosure relates to a method for transmitting signals and receiving signals based on filter bank multiple carrier modulation (FBMCM), and the corresponding transmitters and receivers for the same.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The rapid developments of information industries, especially, the increasing demands from mobile Internet and Internet of things (IoT), bring unprecedented challenges to the mobile communications technologies. As reported in ITU-R M. [IMT.BEYOND 2020.TRAFFIC] from the International Telecommunication Union (ITU), the mobile traffic is expected to grow by nearly 1000 times from year 2010 (in the era of fourth-generation (4G)) to 2020, and the number of the user device connections will surpass 17 billion. As a large amount of IoT equipment gradually penetrate into the mobile communication network, the number of the device connections will become more massive. In order to cope with these unprecedented challenges, the fifth-generation (5G) mobile communications technologies are being under research in the communication industries and in the academic community, facing the year of 2020. Currently, the framework and overall objectives of future 5G are being discussed in the report ITU-R M. [IMT.VISION], in which demand prospects, application scenarios and a variety of key performance requirements are described below. For new demands of 5G, the report of ITU-R M.[IMT.FUTURE TECHNOLOGY TRENDS] provides relevant information on trends of 5G, intending to address significant issues, such as a sharp increase of the system throughput, user experience consistency, scalability to support IoT, latency, energy efficiency, cost efficiency, flexibility of networks, new services' support, flexible spectrum usage and the like.

Modulation waveforms and multiple access schemes are important for designing air-interface of mobile communications, and 5G is no exception. Currently, orthogonal frequency division multiplexing (OFDM), which is a typical representative in the family of multi-carrier modulation (MCM), is widely used in broadcast audio and video fields as well as in civil communication systems, for example, evolved universal terrestrial radio access (E-UTRA) protocols defined by the third generation partnership project (3GPP) which corresponds to the system of long term evolution (LTE), digital video broadcasting (DVB) and digital audio broadcasting (DAB), very-high-bit-rate digital subscriber loop (VDSL), IEEE802.11a/g wireless local area network (WLAN), IEEE802.22 wireless regional area network (WRAN) and IEEE802.16 world interoperability for microwave access (WiMAX) and the like. The idea of OFDM is to divide a wide channel into a plurality of parallel narrowband sub-channels/subcarriers so that high-speed data flows transmitted in frequency selective channels are converted to low-speed data flows transmitted in a plurality of parallel independent flat-fading channels, thereby capabilities of the system to counter multipath interferences are greatly improved. Furthermore, OFDM can utilize inverse fast fourier transform/fast fourier transform (IFFT/FFT) to implement simplified modulation and demodulation modes. Moreover, the insertion of cyclic prefix (CP) converts a channel effect from a linear convolution to a circular convolution. As a result, according to the properties of a circular convolution, when the length of CP is greater than the largest multipath time delay, the signals can be received without inter-symbol interference (ISI) by applying simple one tap frequency-domain equalization, which in turn reduces processing complexity of receivers. Although modulation waveforms based on CP-OFDM are capable of meeting the service demands of mobile broadband (MBB) in the era of 4G, there are many limitations and shortcomings for CP-OFDM application in 5G scenarios since 5G will have to face more challenging and diversified scenarios, which mainly comprises the following scenarios:

(1) The insertion of CP for resisting ISI will greatly reduce spectrum utilization in 5G scenarios of low latency transmissions. To be specific, the low latency transmissions will greatly shorten the length of OFDM symbols and the length of CP is only constrained by the impulse response of channels, and thus the ratio of the length of CP and the length of OFDM symbols will increase greatly. Such overhead results in loss of spectrum efficiency largely and thus is unacceptable.

(2) Strict requirements on time synchronization will result in large signaling overheads required for maintaining the closed loop synchronization in IoT scenarios of 5G. In addition, the strict synchronization mechanism makes data frame structure nonflexible, and thus cannot satisfy the different synchronization requirements of a variety of services.

(3) OFDM adopts rectangular pulse such that the frequency domain sidelobe rolls off very slowly, which causes large out-band leakage. Therefore, OFDM is very sensitive to the carrier frequency offset (CFO). While there will be many demands for fragmented spectrums flexibly access/share in 5G, the high out-band leakage of OFDM greatly limits flexibilities of spectrum access or it needs large frequency-domain protection band, such factors reduce the spectrum utilization accordingly.

These shortcomings are mainly due to OFDM characteristics. Although the impacts caused by these shortcomings can be reduced by adopting certain measures, the shortcomings will increase the complexity of system designs, and these issues cannot be addressed.

Just due to the issues mentioned above, as reported in ITU-R M. [IMT.FUTURE TECHNOLOGY TRENDS], some new waveform modulation technologies (multi-carrier modulation based) are taken into account in 5G, of which filter bank multiple carrier (FBMC) modulation becomes one of the main research objects. As FBMC provides free degrees for designing prototype filter, FBMC can utilize the filters with high performance on time/frequency localization (TFL) to shape pulse of transmission waveforms, such that the transmission signals can show various preferable characteristics, comprising improvement of the spectrum efficiency since no requirements on CP insertion is needed to resist ISI, lower out-band leakage to support flexible access of fragmented spectrums and the insensitiveness to carrier frequency offset. The typical FBMC generally uses a technology named offset quadrature amplitude modulation (OQAM) to maximize the spectrum efficiency. Therefore, such technology is generally called FBMC/OQAM system, also called OFDM/OQAM system. The FBMC applications in digital communications have been discussed in an early article titled as "Analysis and design of OFDM/OQAM systems based on filter bank theory" (IEEE Transactions on Signal Processing, Vol. 50, No. 5, 2002).

Because FBMC has some advantageous characteristics which OFDM does not possess, FBMC gets more attention in 5G research, but some inherent shortcomings challenge FBMC applications in mobile communications, and these challenges need to be addressed urgently and are studied constantly. One of these significant issues is that the filters adopted in FBMC can cause a longer tail effect which is also called as a transition period issue. During the uplink multi-user transmission based on short data blocks (data frames), if the length of the data blocks comprises tail effect to avoid overlapping between the tail and other data blocks, the number of symbols transmitted within active time would decrease, thereby reducing the spectrum efficiency. Therefore, some people hold that FBMC is only suitable for long burst of data transmission. In contrast, if the length of the data blocks does not comprise the tail effect, portions of the tail would overlap with other data blocks (especially with the data blocks from other users), and it would cause serious inter-block interferences if it is not addressed properly, thereby further reducing the spectrum usage efficiency. In addition to multiuser interferences, in time division duplexing (TDD) system, the uplink/downlink transition period also needs to be increased properly to avoid unnecessary uplink/downlink crosstalk generated by the tail effect, which further reduces the spectrum efficiency of the system. Currently, the existing method is to truncate portions of the tail to avoid overlapping with other data blocks. However, truncating waveforms causes a distortion of signals, which can also impact the spectrum efficiency. Moreover, the spectrum of truncated signals extend, generating inter-carrier interference (ICI). Accordingly, such direct truncation is not effective.

In conclusion, in order to improve the competitiveness of FBMC among candidate technologies, it is required to address the inherent shortcomings in addition to developing the advantageous characteristics. For service modes of sporadic access in various scenarios of 5G, especially in IoT scenarios, it is necessary to use an efficient method to address issues caused by the tail effect of FBMC in the mobile communications system.

With respect to the tailing issue in the FBMC system when a data block is transmitted, there is not yet an effective method for reducing the influence on a system brought by a smearing effect. Therefore, the present disclosure provides an effective method for restraining tailing, which can reduce an additional consumption brought by the smearing effect while high signal receiving performance and frequency spectrum leakage characteristics can be ensured such that a frequency spectrum efficiency of the FBMC system can be maximized.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for transmitting signals and receiving signals based on FBMC modulation (FBMCM), and the corresponding transmitters and receivers for the same.

In accordance with an aspect of the present disclosure, a method for transmitting signal based on a filter bank multi-carrier modulation is provided. The method includes pre-processing determined symbols in a data block comprising at least one symbol, modulating the preprocessed data block with the filter bank multi-carrier modulation, truncating the modulated data block to remove a part or all of tailing data from the modulated data block, and transmitting the modulated data block, from which the part or all of tailing data has been removed, wherein the determined symbols are affected by the truncating of the modulated data block.

In various embodiments of the present disclosure, the preprocessing of the determined symbols comprises pre-coding the determined symbols.

In an embodiment of the present disclosure, a pre-coding matrix used by the pre-coding of the determined symbols is determined according to filter parameters used in the filter bank multi-carrier modulating and parameters used in the truncating of the modulated data block.

In an embodiment of the present disclosure, the parameters used in the truncating of the modulated data block comprise a determined truncation length.

In an embodiment of the present disclosure, the pre-coding matrix has a dimension of $N \times N$ or $N_0 \times N_0$, where $N$ is the number of scheduling sub-carriers, $N_0 < N$ is a fixed value, wherein the pre-coding matrix with the dimension of $N_0=N_0$ is used repeatedly to pre-code $N_0$ sub-carrier signals in the determined symbols so as to pre-code all of the N sub-carrier signals.

In an embodiment of the present disclosure, the pre-coding matrix comprises one selected from a group consisting of an inverse matrix based on an inter-carrier interference matrix generated by the modulated data block after the truncating of the modulated data block, and a pseudo-inverse-matrix of the inter-carrier interference matrix estimated based on a minimum mean square error (MMSE) criterion.

In an embodiment of the present disclosure, the pre-coding of the determined symbols is adjusted dynamically based on a modulation order used for the determined symbols.

In an embodiment of the present disclosure, the adjusting further comprises disabling the pre-coding of the determined symbols when the determined symbols are modulated with a low-order modulation, and enabling the pre-coding of the determined symbols when the determined symbols are modulated with a high-order modulation.

In an embodiment of the present disclosure, the preprocessing of the determined symbols comprises allocating reference signals required in the data block onto the determined symbols.

In an embodiment of the present disclosure, allocating reference signals required in the data block onto the determined symbols comprises allocating protection symbols or interference cancellation symbols in the reference symbols onto the determined symbols.

In an embodiment of the present disclosure, the preprocessing of the determined symbols comprises assigning channels requiring a low-order modulation mode in the data block onto the determined symbols.

In an embodiment of the present disclosure, the channels requiring the low-order modulation comprise control channels.

In further embodiments of the present disclosure, the preprocessing of the determined symbols comprises allocating data included in un-determined symbols in an initial transmitting data block onto the determined symbols.

Additionally, in some embodiments of the present disclosure, the truncating of the modulated data block comprises selecting a truncation length such that a length of the truncated data block satisfies one integer unit.

Additionally, in some embodiments of the present disclosure, the truncating of the modulated data block comprises at least one of setting the part or all of the tailing data into zero, and windowing the part or all of the tailing data.

In an embodiment of the present disclosure, the truncating of the modulated data block comprises setting a part or all of the tailing data into zero and/or windowing a part or all of the tailing data so as to satisfy at least one of following conditions an adjacent frequency leakage of the truncated data block is no more than a determined threshold, and an inter-block interference in time domain of a plurality of data blocks from at least one user is no more than a determined level.

In accordance with another aspect of the present disclosure, a method for receiving signal based on a filter bank multi-carrier modulation is provided. The method includes receiving at least one symbol in a data block according to a determined truncation length, and demodulating each of the symbols based on filter bank multi-carrier demodulation mode.

In various embodiments of the present disclosure, the receiving comprises receiving only a part of the un-truncated symbols during transmitting when a determined symbol affected by the truncating of the modulated data block is received.

In various embodiments of the present disclosure, the demodulating comprises padding, for the determined symbols affected by truncating, zero to the part of the un-truncated symbols according to the determined truncation length, so as to obtain symbols with an original length of the symbols, and demodulating the symbols with original symbol length based on the filter bank multi-carrier.

In accordance with another aspect of the present disclosure, a transmitting device is provided. The transmitting device includes a preprocessing unit configured to preprocess determined symbols in a data block comprising at least one symbol, a modulating unit configured to modulate the preprocessed data block with the filter bank multi-carrier modulation, a truncation unit configured to truncate the modulated data block to remove a part or all of tailing data from the modulated data block, and a transmitting unit configured to transmit the modulated data block, from which the part or all of tailing data has been removed, wherein the determined symbols are affected by the truncating of the modulated data block.

In accordance with another aspect of the present disclosure, a receiving device is provided. The receiving device includes a receiving unit configured to receive at least one symbol in a data block according to a determined truncation length, and a demodulating unit configured to demodulate each of the symbols based on filter bank multi-carrier demodulation mode.

It is noted that the embodiments in the first aspect can also be applied in the third aspect. Similarly, the embodiments in the second aspect can also be applied in the fourth aspect.

According to the particular embodiments of the technique described in the present disclosure, the tailing effect can be restrained effectively by preprocessing the symbols affected by truncating before being truncated, so as to ensure the well signal receiving performance and frequency spectrum leakage characteristic and to maximize the frequency spectrum effect of the FBMC system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description—taken in conjunction with the accompanying drawings, in which.

Throughout the drawings, like reference numerals will be understood to refer to like parts, components, and structures.

DETAILED DESCRIPTION

Figure 1:
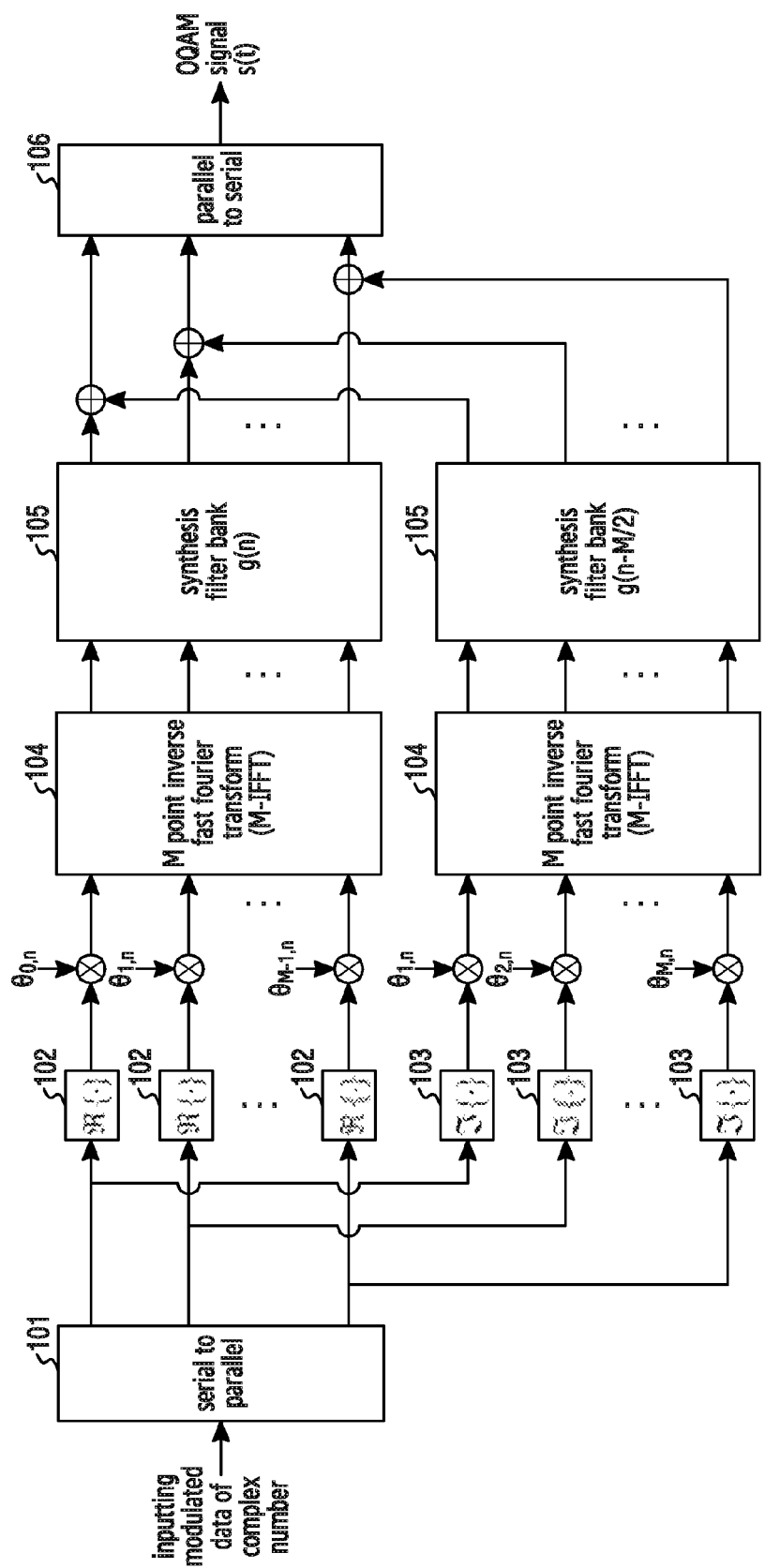
FIG. 1 is a block diagram illustrating generating filter bank multi-carrier (FBMC)/offset quadrature amplitude modulation (OQAM) signals according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Provided that there is no conflict, it should be noted that the embodiments of the present disclosure, and features in the embodiments of the present disclosure may be combined. Hereinafter, the present disclosure will be explained with reference to the accompanying drawings in connection with the embodiments of the present disclosure.

A signal waveform having improved time/frequency localization (TFL) can be obtained by a modulation based on the filter bank multi-carrier (FBMC), such as based on prototype filter functions, such as isotropic orthogonal transform algorithm (IOTA), extended Gaussian function (EGF) and European physical layer for dynamic spectrum access and cognitive radio (PHYDYAS), and the like. The FBMC implements a pulse shaping on signals of each sub-carrier by using a shaping filter having improved TFL, such that: 1) the FBMC can greatly suppress the inter-symbol interference (ISI) from multipath without cyclic prefix (CP), which can result in a higher frequency spectrum efficiency and energy efficiency relative to the orthogonal frequency division multiplexing (OFDM), but also obtain a high receiving reliability under a larger timing synchronization error by permitting an asynchronous transmission, and 2) with the improved TFL, the FBMC can transmit signals in extremely narrow frequency band and keep a very low out-band leakage by suppressing the inter-carrier interference (ICI) resulted from Doppler and the phase noise. Therefore, the FBMC has great potential on cognizing radio, the fragmented band access and the asynchronous transmission and the like.

In order to achieve the highest frequency spectrum efficiency of the FBMC, the offset quadrature amplitude modulation (OQAM) is needed, which is referred to as FBMC/OQAM or OFDM/OQAM (OQAM is used hereafter in short). In the OQAM, one QAM symbol is divided into two signals, and these two signals are modulated to the real or imaginary component of a sub-carrier respectively and alternately, and they are transmitted with a time offset. At a receiving end, if there is no effect from the channel, the transmitted signal can be recovered by extracting alternately the real or imaginary component of the signal on each sub-carrier.

FIG. 1 is a block diagram illustrating generating FBMC/OQAM signals according to an embodiment of the present disclosure.

Referring to FIG. 1, M parallel data are obtained after an inputted complex number modulated data, such as a complex number QAM symbol, is serial-to-parallel converted through a serial/parallel converter module 101, where M is the number of the sub-carriers. Each signal is divided into two signals, and the real and imaginary components of these two signals are extracted respectively through a real component extracting module 102 and an imaginary component extracting module 103. The real component and the imaginary component of the signals are modulated respectively via an inverse fast Fourier transform module 104. The modulated signals are transmitted to a synthesis filter bank module 105 to perform the pulse shaping. At last, the real component and the imaginary component of the signals are combined, and the combined signals go through a parallel/serial converter module 106 to output the OQAM signal.

The functions of each module shown in FIG. 1 can be easily understood from the mathematical signal modeling of the OQAM signal. The equivalent form of the base band of the continuous-time multi-carrier FBMC/OQAM signal can be formulated as:

$$s(t) = \sum_{n \in Z} \sum_{m=0}^{M-1} a_{m,n} \underbrace{j^{m+n} e^{j2\pi m v_0 t} g(t-n\tau_0)}_{g_{m,n}(t)} \qquad \text{Equation 1}$$

where $(\bullet)_{m,n}$ represents a frequency-time point, $a_{m,n}$ represents a real number modulated signal on the m-th sub-carrier of the n-th symbol, that is, a pulse amplitude modulation (PAM) symbol, $a_{m,n}$ is the value of the real or imaginary component of the complex number QAM symbol $c_{m,\tilde{n}}$ with a symbol period $\tau = 2\tau_0$, such as $$a_{m,n} = \begin{cases} \mathfrak{R}\{c_{m,\tilde{n}}\} n \text{ is even number} \\ \mathfrak{I}\{c_{m,\tilde{n}}\} n \text{ is odd number} \end{cases}$$

$\mathfrak{R}\{\bullet\}$ and $\mathfrak{I}\{\bullet\}$ represent extracting real component and extracting imaginary component, respectively, j is an imaginary symbol, $j^{m,n}$ represents the real-imaginary alternation, which is represented via $\theta_{m,n}$ in FIG. 1, M is an even number representing the number of the sub-carriers, Z is a set of the transmitted symbols, $v_0$ is the spacing between the sub-carriers, $\tau_0$ is the symbol period of the OQAM and $\tau_0 = \tau/2 = 1/(2v_0)$ g is a prototype filter function, whose time domain impulse response length is generally K times the $\tau$ which results in an overlapping of the time domain waveform of the adjacent (2K-1) symbols, and thus the K is generally referred to as an overlapping factor of the filter. $g_{m,n}(t)$ is a complete synthesis filter function for modulating $a_{m,n}$. It can be seen that the symbol rate of the OQAM is two times of the symbol rate of the traditional OFDM without adding the CP. Because the modulation of the OQAM is based on real number, the information amount of each OQAM symbol is half of that of the traditional OFDM. For example, the signal transmission rate of an OQAM system is the same as that of an OFDM system without CP.

The real field orthogonality of the OQAM is achieved by designing prototype filter function g. The inner product of the synthesis filter function at the transmitting end and the analysis filter function at the receiving end needs to meet or approximately meet Equation 2, that is, the prototype filter needs to meet:

$$\mathfrak{R}\{\underbrace{\langle g_{m,n} | g_{m',n'} \rangle}_{\langle g \rangle_{m,n}^{m',n'}}\} = \mathfrak{R}\left(\int g_{m,n}(t) \cdot g^*_{m',n'}(t) dt\right) = \delta_{m,m'} \delta_{n,n'} \qquad \text{Equation 2}$$

where * represents complex conjugating, $\mathfrak{R}\{\bullet\}$ represents an operation of extracting real component, $\langle \bullet \rangle$ represents inner product, if m=m and n=n', $\delta_{m,m'}=1$, $\delta_{n,n'}=1$ otherwise the value is 0. For example, if m≠m' or n≠n', the inner product is pure imaginary term. In order to facilitate the description, $\langle g \rangle$ is used to represent the inner product. It is obvious that the interference generated by the signals between the different sub-carriers and the different symbols is pure imaginary component interference. Accordingly, when the signal s(t) modulated by the FBMC/OQAM goes through a distortion-free channel, the perfect reconstruction (PR) of the original transmitted real number signal $a_{m,n}$ can be achieved by simply processing the received signal according to Equation 3 via the receiving analysis filter (AF) $g^*_{m,n}(t)$ which is matched with the transmitting synthesis filter (SF) $g_{m,n}(t)$, where $\eta_0$ is noisy term, then the original data can be modulated by synthesizing the complex QAM signal $c_{m,\tilde{n}}$.

$$\hat{a}_{m,n} = \mathfrak{R}\{y_{m,n}\} = \mathfrak{R}\{\langle (s(t)+n(t))|g_{m,n}\rangle\} = a_{m,n} + \eta_0,$$
$$m=0, \ldots M-1, n \in Z \qquad \text{Equation 3}$$

As mentioned above, a significant issue of the FBMC is that the adopted filter may result in a longer tailing effect of the time domain waveform. If the tailing part is truncated, then the signal distortion will be caused, which will also affect the frequency spectrum efficiency.

Figure 2:
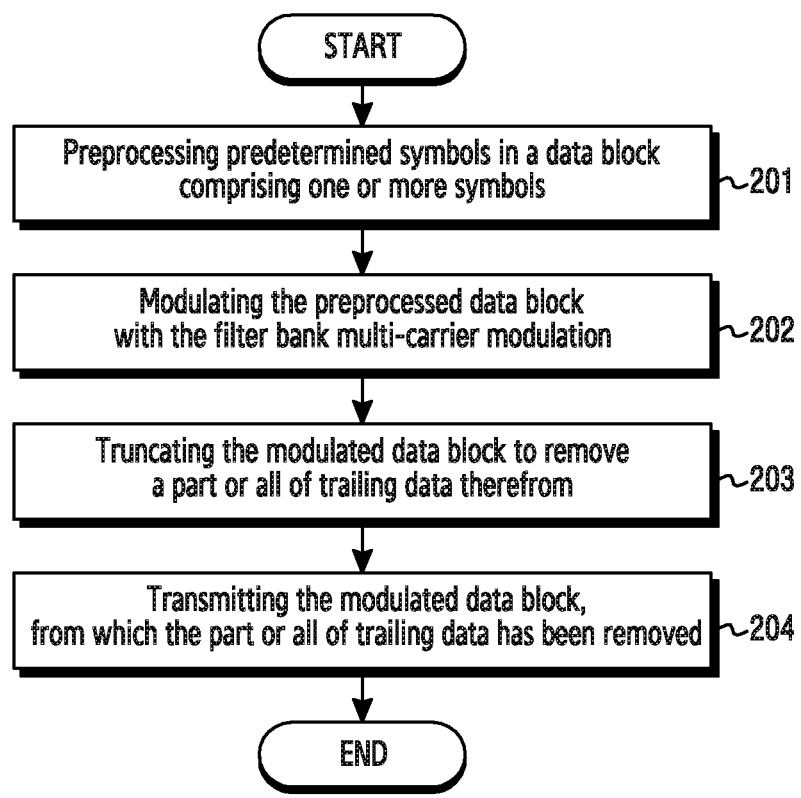
FIG. 2 is a flowchart illustrating a method for transmitting signals based on filter bank multicarrier modulation according to an embodiment of the present disclosure.

FIG. 2 is a flowchart of a method for transmitting signal based on a filter bank multi-carrier modulation according to an embodiment of the present disclosure.

Referring to FIG. 2, in operation 201, determined symbols in a data block comprising at least one symbol are preprocessed.

In operation 202, the preprocessed data block is modulated with the filter bank multi-carrier modulation.

In operation 203, the modulated data block is truncated to remove a part or all of tailing data therefrom.

In operation 204, the modulated data block, from which the part or all of tailing data has been removed, is transmitted.

In the preprocessing operation 201, the determined symbols are the symbols that will be affected by the truncating of the modulated data block. For example, the determined symbols are the symbols near the truncating position, such as the first and the last symbols, which will be distorted due to the truncating of the modulated data block.

By preprocessing the symbols that will be affected by the truncating of the modulated data block before the truncating of the modulated data block, the tailing effect resulted from the truncating of the modulated data block can be effectively suppressed in order to keep a high signal reception performance and frequency spectrum leakage performance and to maximize the frequency spectrum efficiency of the filter bank multi-carrier system.

There are many methods to preprocess the determined symbols. In the following, the methods for transmitting signals according to embodiments of the present disclosure will be described with reference to the particular examples.

Embodiment 1

In the present embodiment of the present disclosure, the preprocessing comprises pre-coding the determined symbols, i.e., pre-coding frequency domain multi-carrier signals, in order to counteract the interference resulted from the subsequent truncating.

To make it easier to be understood, the interference resulted from the truncating of the modulated data block if the determined symbols are not preprocessed is first analyzed.

For example, considering a system using M=256 sub-carriers, the data block includes 28 OQAM symbols (Z={0, 1, 2, ..., 27} the overlapping factor K=4, and PHYDYAS filter is used as the filter parameters. The time domain response can be formulated as:

$$g(0) = 0,$$

$$g(l) = 1 - 1.94392 \cos\left(\frac{2\pi l}{L_g}\right) + 1.414 \cos\left(\frac{4\pi l}{L_g}\right) - 0.47029 \cos\left(\frac{6\pi l}{L_g}\right),$$

$$1 \le l \le L_g - 1$$

here, $L_g = KM = 1024$

At this time, the number of the time domain sampling points of the data block is (14×M (K−1)×M+M/2). Relatively, an OFDM data block (14 OFDM symbols) having the same rate but without CP includes 14×M time domain sampling points. By comparing both of them, the modulation method of the OQAM has (K−1)×M+M/2 time domain sampling points more, where (K−1)×M sampling points are resulted from the adoption of the waveforms of the shaping filters with KM time sampling points, and the other M/2 sampling points are resulted from the delay of the IQ channels of the OQAM modulation. Generally, these sampling points can be seen as the tailing effect. If (K−1)×M/2+M/4 sampling points are truncated at two sides of the OQAM data block, respectively, the tailing effect of the OQAM modulation will be totally removed. However, such truncating has large effect on waveform, especially for the OQAM symbols at the front and end, thereby resulting in the degradation of the reception performance of the data block.

FIG. 3A is a schematic diagram illustrating truncating of a data block with respect to sampling points truncated at two sides, respectively, according to an embodiment of the present disclosure.

Referring to FIG. 3A, the left panel shows the signal waveform of the complete data block, and the right panel shows the signal waveform of the data block after the truncating.

FIG. 3B illustrates truncating of a first OQAM symbol in a data block in which sampling points are truncated at a front part of the symbol according to an embodiment of the present disclosure.

Referring to FIGS. 3A and 3B, the left panel of FIG. 3A shows the complete waveform of the OQAM symbol, the right panel shows the waveform of the truncated OQAM. The truncating as shown in FIGS. 3A and 3B is directly setting the signals in the truncating section to zero.

Figure 3:
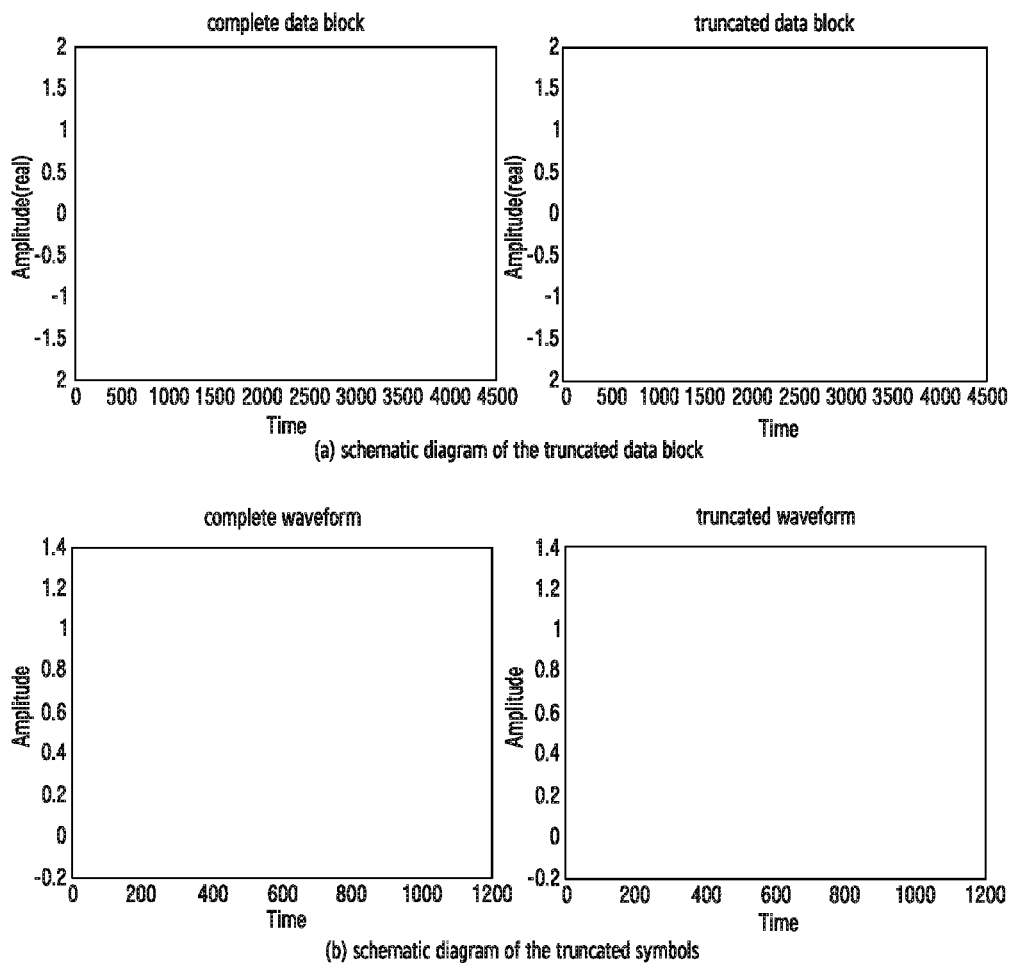
FIGS. 3A and 3B are schematic diagrams illustrating truncated data blocks and signals according to various embodiments of the present disclosure.

$[d1, d2j, \ldots, dNj]^T$ is defined as modulating the signal with imaginary-real component alternatively on the symbol, where d is pure real number signal, j is imaginary symbol. Without effect of the channel and the noise, the received signal is $[e1, e2, \ldots, eN]^T$ where e is complex number signal. The relation between the transmitted signal and the received signal can be formulated as Equation 4:

$$\begin{bmatrix} e1 \\ e2 \\ \vdots \\ eN \end{bmatrix} = \begin{bmatrix} 1 & \beta & 0 & \ldots & 0 \\ \beta & 1 & \beta & \ldots & 0 \\ \vdots & \vdots & \vdots & \ddots & \vdots \\ 0 & 0 & 0 & \ldots & 1 \end{bmatrix} \begin{bmatrix} d1 \\ d2j \\ \vdots \\ dNj \end{bmatrix} \quad \text{Equation 4}$$

where $$I = \begin{bmatrix} 1 & \beta & 0 & \ldots & 0 \\ \beta & 1 & \beta & \ldots & 0 \\ \vdots & \vdots & \vdots & \ddots & \vdots \\ 0 & 0 & 0 & \ldots & 1 \end{bmatrix}$$

is an interference matrix.

β is the inter-carrier interference (ICI) interference factor of a carrier to the adjacent carriers, which is pure real number. It should be noted that only ICI is considered, rather than ISI, because the ICI brings the dominant effect of the truncating as shown in the subsequent analysis. According to Equation 4, because the diagonal elements of the interference matrix are 1 and the interference factor β is real number, the interference received by the receiver can be eliminated by extracting the real and imaginary components. When performing the truncating as shown in FIG. 3 on signals, the received signal will be affected by the ICI and the ICI cannot be removed by extracting the real and imaginary components. At this time, the model of the signal is formulated as Equation 5:

$$\begin{bmatrix} e1 \\ e2 \\ \vdots \\ eN \end{bmatrix} = \begin{bmatrix} \alpha & \gamma & 0 & \ldots & 0 \\ \varphi & \alpha & \gamma & \ldots & 0 \\ \vdots & \vdots & \vdots & \ddots & \vdots \\ 0 & 0 & 0 & \ldots & \alpha \end{bmatrix} \begin{bmatrix} d1 \\ d2j \\ \vdots \\ dNj \end{bmatrix} \quad \text{Equation 5}$$

where α, γ, φ are complex numbers. According to Equation 5, the transmitted signal $[d1, d2, \ldots, dN]^T$ cannot be recovered by extracting the real and imaginary components from $[e1, e2, \ldots, eN]^T$. By defining the signal $[e1', e2', \ldots, eN']^T = [\Re(e1), \Im(e2), \ldots, \Im(eN)]^T$, the following Equation 6 can be obtained:

$$\begin{bmatrix} e1' \\ e2' \\ \vdots \\ eN' \end{bmatrix} = \begin{bmatrix} \alpha' & \gamma' & 0 & \ldots & 0 \\ \varphi' & \alpha' & \gamma' & \ldots & 0 \\ \vdots & \vdots & \vdots & \ddots & \vdots \\ 0 & 0 & 0 & \ldots & \alpha' \end{bmatrix} \begin{bmatrix} d1 \\ d2 \\ \vdots \\ dN \end{bmatrix} \quad \text{Equation 6}$$

where $$I' = \begin{bmatrix} \alpha' & \gamma' & 0 & \ldots & 0 \\ \varphi' & \alpha' & \gamma' & \ldots & 0 \\ \vdots & \vdots & \vdots & \ddots & \vdots \\ 0 & 0 & 0 & \ldots & \alpha' \end{bmatrix}$$

is equivalent interference matrix, where α', γ', φ' are pure real numbers. At this point, the equivalent interference matrix includes pure real numbers. For example, the PAM signal whose real and imaginary components are extracted at receiving end equals the original PAM signal times an equivalent interference matrix that includes pure real numbers.

Therefore, in the present embodiment of the present disclosure, the pre-coding matrix can be used at the transmitting end to pre-code the transmitted signals to overcome the interference from the truncating.

The pre-coding of the transmitted signals, for example, can be formulated as the Equation 7:

$$\begin{bmatrix} d1' \\ d2' \\ \vdots \\ dN' \end{bmatrix} = [P] \begin{bmatrix} d1 \\ d2 \\ \vdots \\ dN \end{bmatrix} \quad \text{Equation 7}$$

where [P] is a pre-coding matrix having a dimension of N×N. Thereafter, the real-imaginary alternative [d1', d2', ..., dN'j] is transmitted at the transmitting end by using OQAM modulation. Therefore, selecting an appropriate pre-coding matrix [P] can effectively overcome the ICI from the truncating. It can be understood that, since the filter parameters used in the equivalent interference matrix and the filter bank multi-carrier modulation are related with the parameters used in the truncating, the pre-coding matrix used by the pre-coding to counteract the interference from the truncating is determined based on the filter parameters used in the filter bank multi-carrier modulating and the parameters used in the truncating.

In an embodiment of the present disclosure, the pre-coding matrix is determined by using the zero forcing criteria, which is a simple and efficient method. The pre-coding matrix in the present example is: $P=(I')^{-1}$, that is, the inverse matrix of the inter-carrier interference matrix that is generated after the truncating. In the case that the determined truncation length and the filter parameter are determined, the equivalent interference matrix I' can be obtained by off-line calculation and simulation. Therefore, the pre-coding matrix calculated based on I' can be applied (for example, $P=(I')^{-1}$) and the particular symbols affected by the truncating is pre-coded at the transmitting end.

In another example, an estimation method is used, for example, the pre-coding matrix is estimated based on a minimum mean square error (MMSE) criterion. The pre-coding matrix estimated by MMSE criterion is a pseudo-inverse-matrix of the inter-carrier interference matrix generated after the truncating.

It can be known from the above analysis that, the pre-coding matrix is only related with the filter parameter and the truncation length. Accordingly, the calculation of the pre-coding matrix can be operated offline, which greatly decreases the complexity of the implement of the algorithm.

In various embodiments of the present disclosure, the pre-coding matrix has a dimension of N×N where N is the number of the scheduled sub-carriers. When N is relative large, the pre-coding (such as Equation 7) still needs higher computational complexity.

Optionally, in some examples, the pre-coding matrix used by the pre-coding can have a fixed dimension. Such matrix is used to pre-code the sub-carrier block having fixed length, and the pre-coding is repeated so as to pre-code all of the N sub-carrier signals. Because the OQAM modulation has improved frequency localization, most interferences concentrate near the adjacent carriers, that is, the interference matrix has nonzero value only near the diagonal elements. Therefore, a method having low complexity is to only use a pre-coding matrix having a relative small fixed dimension. For example, the pre-coding matrix having a fixed dimension can be formulated as:

$$P_{N_0}=(I_{N_0})^{-1} \qquad \text{Equation 8}$$

where $P_{N_0}$ is the pre-coding matrix having a dimension of $N_0 \times N_0$, $N_0 < N$ is a fixed smallest pre-coding unit dimension.

For example, a physical resource block (PRB) is the smallest scheduling unit including 12 sub-carriers in a long term evolution (LTE) system. Therefore, $N_0=12$ can serve as an appropriate value. $I_{N_0}$ is a matrix having a dimension of $N_0 \times N_0$ whose elements respectively equal the elements from row 1 to row $N_0$ and from column 1 to column $N_0$ of I', that is:

$$I_{N_0}(m,n)=I'(m,n), m=1,2,\ldots,N_0, n=1,2,\ldots,N_0 \qquad \text{Equation 9}$$

Therefore, the transmitting end can pre-code $N_0$ sub-carriers via $P_{N_0}$ every time, and repeats the pre-coding until all N sub-carriers are pre-coded, such that the complexity of the matrix calculation can be greatly decreased, especially when there are more carriers.

In the transmitting system, the transmitting end generally can adjust dynamically the modulation and the coding scheme (MCS) according to the status of the channels. When a lower order modulation is used for the data block, such as a binary phase shift keying (BPSK) or a quadrature phase shift keying (QPSK) modulation, the effect from the truncating on the demodulation of the signals can be ignored. Therefore, in some examples, pre-coding can be adjusted dynamically based on the method of modulation and coding scheme used by the symbols in the data block. For example, when the symbols are modulated with a low-order modulation, the pre-coding is not necessary, for example, closing, and disabling or bypassing pre-coding module can be performed, when the symbols are modulated with a high-order modulation, the pre-coding can be performed, for example, by turning on or starting the pre-coding module.

Figure 4:
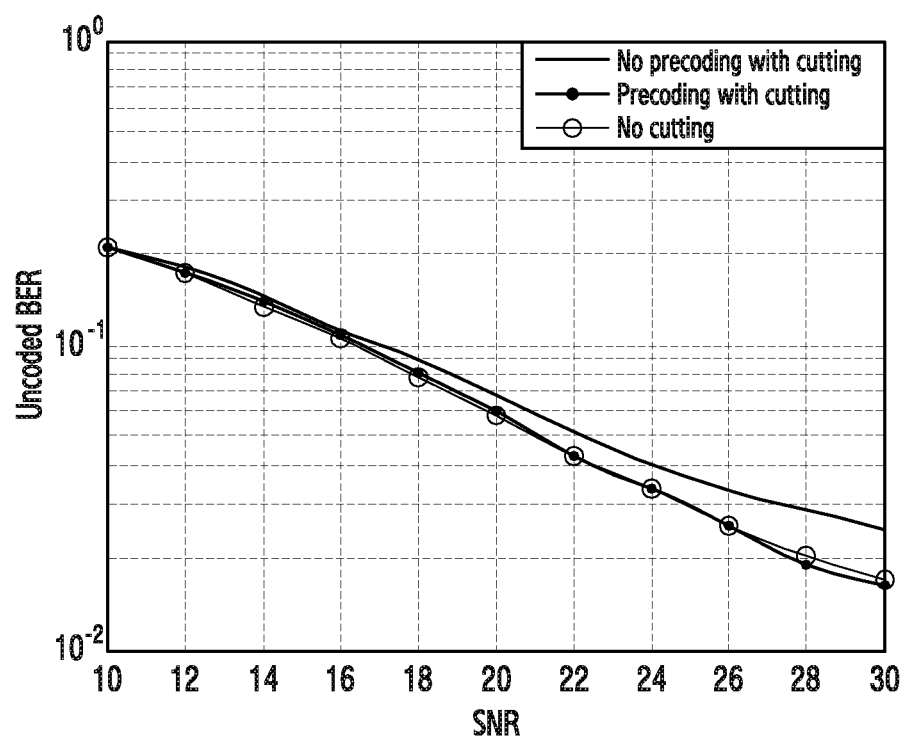
FIG. 4 is a performance simulation result of a pre-coding method according to an embodiment of the present disclosure.

FIG. 4 is a schematic diagram illustrating a performance simulation result by using a pre-coding method of the present embodiment according to an embodiment of the present disclosure.

Referring to FIG. 4, in the illustrated simulation, the system uses M=256 sub-carriers, the repeating factor is K=4, the data block includes 28 OQAM symbols, the filter is PHYDYAS filter, the channel is extended typical urban (ETU) channel, and the modulation is 64QAM. FIG. 4 shows the system performance simulation results of the truncating without pre-coding and the truncating with the pro-coding of the present embodiment of the present disclosure, as well as the system performance simulation result without the truncating, respectively.

Referring to FIG. 4, when the system is performing the truncating (in the present simulation, for example, truncating (K−1)×M/2+M/4=448 sampling points on two sides, respectively), the performance of the bit error rate (BER) of the system degrades when the signal-noise ratio (SNR) is high. When using the method of pre-coding, in the simulation of the present embodiment of the present disclosure, the pre-coding with a low complexity as described above is only used for the first symbol and the last symbol, that is to say, the pre-coding matrix having fixed a small dimension ($N_0=12$) is used. It can be seen that the performance degradation due to the truncating disappears. As a result, the method of pre-coding provided by the embodiment of the present disclosure can effectively eliminate the effect of the performance from the truncating of the data block.

Embodiment 2

In the present embodiment of the present disclosure, preprocessing a determined symbol comprises selecting a signal to be allocated to the determined symbol according to different conditions of the data blocks to be transmitted.

In an embodiment of the present disclosure, the preprocessing may comprise allocating a reference signal required in a data block to a determined symbol to be affected by the truncation operation.

Generally, in a data block, in addition to the payload data, specific resources must be reserved to transmit the reference signal, so that the receiving end may perform channel estimation. Since the reference signals are known signals and the influence resulted from the truncation operation is mainly on the resulting ICI which is also known, allocating the reference signals to a symbol affected by the truncation operation still allows the receiving end to complete channel estimation.

Figure 5:
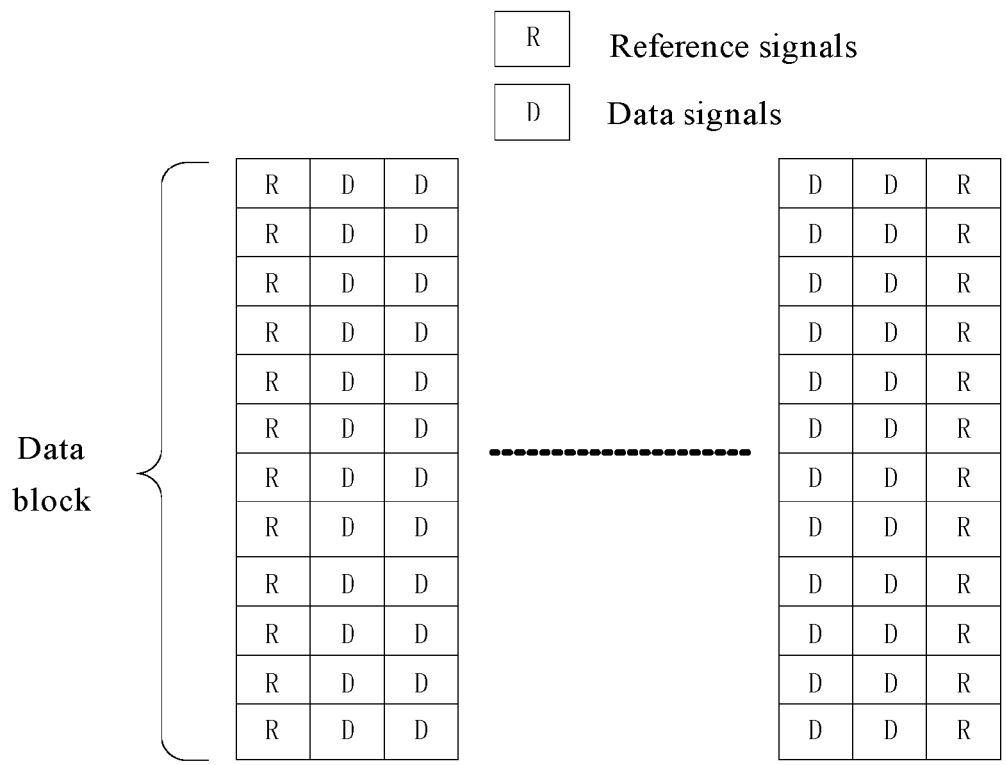
FIG. 5 is a schematic diagram illustrating reference signals allocation within a data block according to an embodiment of the present disclosure.

FIG. 5 is a schematic diagram illustrating a reference signal allocation of a data block according to an embodiment of the present disclosure.

Referring to FIG. 5, the reference signal is allocated into the outermost two symbols. The reference signal may be interference by the ICI after the truncation processing. The interference may be expressed as, for example, Equation 10:

$$\begin{bmatrix} e1 \\ e2 \\ \vdots \\ eN \end{bmatrix} = \begin{bmatrix} \alpha & \gamma & 0 & \ldots & 0 \\ \varphi & \alpha & \gamma & \ldots & 0 \\ \vdots & \vdots & \vdots & \ddots & \vdots \\ 0 & 0 & 0 & \ldots & \alpha \end{bmatrix} \begin{bmatrix} r1 \\ r2j \\ \vdots \\ rNj \end{bmatrix} \quad \text{Equation 10}$$

where $[r1, r2j, \ldots, rNj]^T$ is an original reference signal vector.

Since the interference matrix and the original reference signal are both known, a reference signal vector $[e1, e2, \ldots, eN]^T$ after truncation may be calculated at the receiving end, and channel estimation may be performed according to the reference signal vector, i.e., $\tilde{H}_n = Y_n/en$, where $Y_n$ is a complex signal received on the nth sub-carrier in the frequency domain, and $\tilde{H}_n$ is a frequency-domain channel estimation.

Furthermore, in an OQAM system, the ISI interference in the OQAM system should always be considered for the design of the reference signal. Therefore, use of a special protection symbol is proposed in some reference signal designs. The protection symbol may be zero valued protection symbol or other interference cancellation symbols which are generated to cancel the interference to the reference signal.

Accordingly, in an embodiment of the present disclosure, allocating a reference signal desired in the data block to a determined symbol to be affected by the truncation operation comprises allocating the protection symbol or interference cancellation symbols in the reference signal to the determined symbol. Therefore, in a truncated data block, a zero valued protection symbol may be allocated to a truncated symbol. The truncation will not have any impact on the system, since the receiving end does not use any zero valued symbols.

Figure 6:
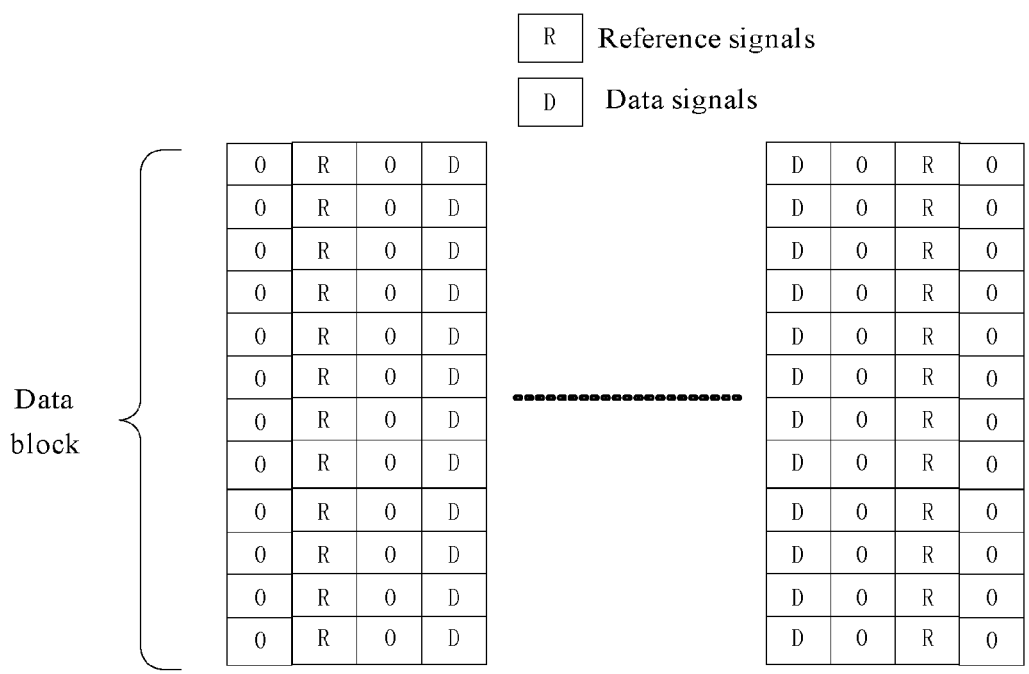
FIG. 6 is a schematic diagram illustrating reference signals allocation comprising zero valued protection symbols according to an embodiment of the present disclosure.

FIG. 6 is a schematic diagram of allocation of a reference signal comprising a zero valued protection symbol according to an embodiment of the present disclosure.

Referring to FIG. 6, the zero valued protection symbols are affected by the truncation, while the reference signal is not affected. Other reference signal designs using interference cancellation method may also be applicable to a similar allocation, so that only the symbol for interference cancellation is affected by the truncation.

In an embodiment of the present disclosure, the preprocessing may comprise assigning a channel which needs lower-order modulation mode in a data block to a determined symbol that may be affected by the truncation operation.

As previously mentioned, in the transmission system, the transmitting end may dynamically adjust the modulation and coding schemes according to the channel status. When the data block uses a lower-order modulation mode, for example, BPSK or QPSK modulation, the influence of the truncation operation to the signal demodulation is negligible. Consequently, the channel that needs lower-order modulation in the data block, for example, includes but is not limited to control channel, may be assigned to a determined symbol affected by truncation. Since the control channel always employs a lower-order modulation, the system performance will not be significantly affected even it is truncated.

In an embodiment of the present disclosure, the preprocessing may comprise allocating data in un-determined symbols in an initial transmitting data block onto determined symbols that affected by the truncation when transmitting a retransmitted data block.

In a system using an automatic retransmission query (ARQ) mechanism, the retransmission signal may apply soft combination with the original signal. The truncation operation has an impact on the specific symbols, so that the data loaded on these symbols are likely to subject to strong interference. Accordingly, an interleaving method may be used in the retransmission data block in the system, so as to load different data onto specific symbols of the retransmission data block.

Figure 7:
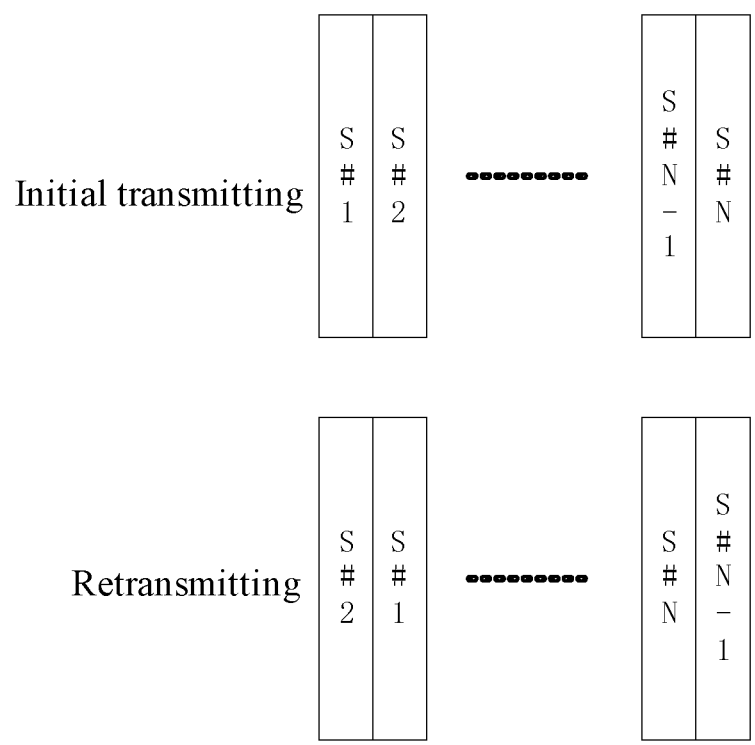
FIG. 7 is a schematic diagram illustrating allocation for an initial transmission data block and a retransmission data block according to an embodiment of the present disclosure.

FIG. 7 is a schematic diagram illustrating allocation of an original transmission data block and a retransmission data block according to an embodiment of the present disclosure.

Referring to FIG. 7, in the original transmission data block, the #1st and the #Nth are allocated in a determined symbol affected by the truncation. In the retransmission data block, the #2nd and the #N−1th are allocated in a determined symbol affected by the truncation. Therefore, any data will not be affected by the truncation twice successively during soft combination of the two transmissions.

It will be appreciated that the preprocessing methods in embodiments 1 and 2 may be implemented individually or in combination. For example, in an embodiment of the present disclosure, the reference signal in the data block is allocated to the determined symbols that will be affected by truncation, and the determined symbols are pre-coded simultaneously. In this way, the interference due to truncation may be reduced or offset for the reference signal. It will be appreciated by those skilled in the art that various combinations are possible without conflict. The combinations will not be enumerated herein.

Embodiment 3

The truncation used in embodiments 1 and 2 is setting the signals in the truncation interval into zero directly, i.e., setting a part or all of the tailing data into zero. The method has an advantage that it may effectively shorten the length of the data block. However, the disadvantage of the method is that the frequency domain localization of signal is deteriorated due to damage to the waveform, and the deterioration leads to strong out of band leakage. In the present embodiment of the present disclosure, truncation may comprise windowing to a part or all of the tailing data. In an embodiment of the present disclosure, truncation may comprise setting a part of the sampling points in the truncation region to zero and performing windowing to the remaining sample points. Taking the data blocks in embodiment 1 as an example, for example, 448 sample points in total are truncated on each side of the data block, 200 sample points may be selected to be set to zero, and the remaining 248 sample points may be windowed.

Figure 8:
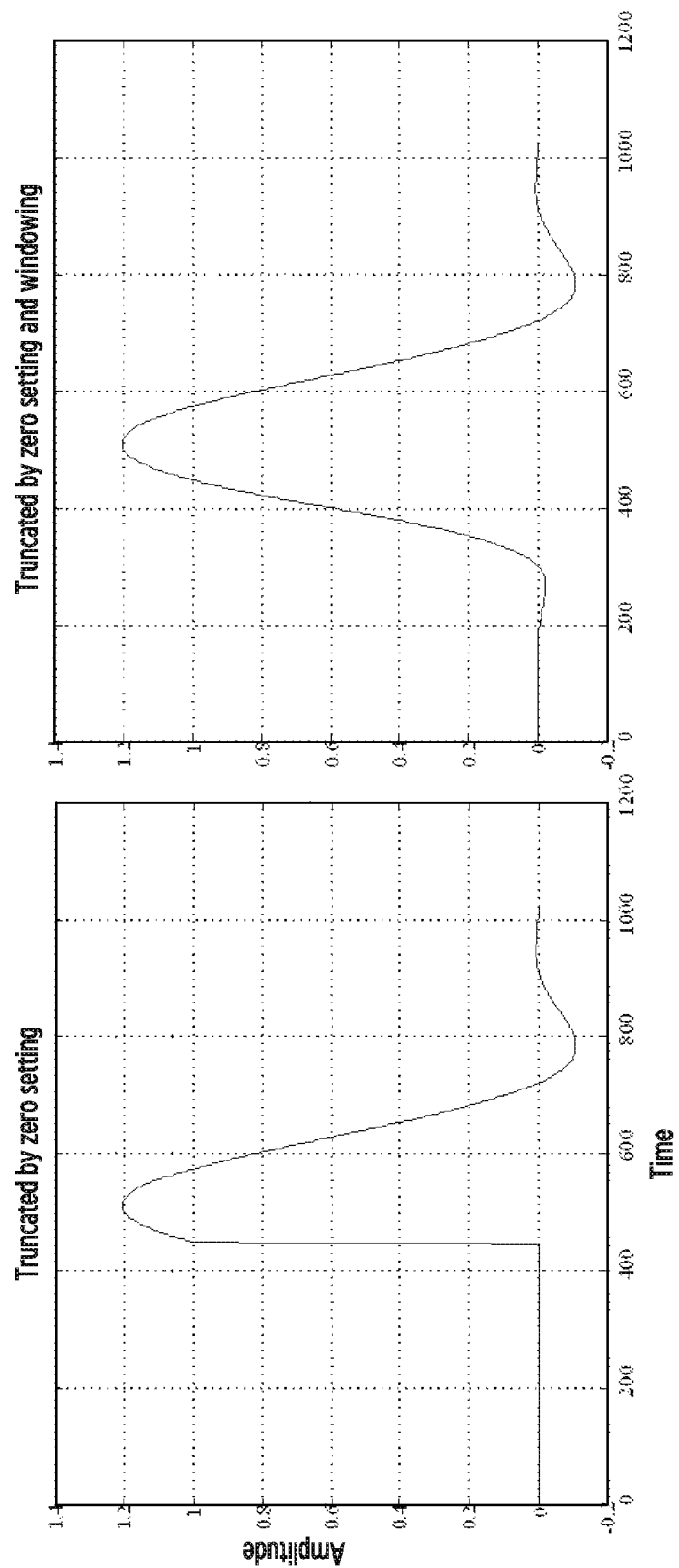
FIG. 8 is a schematic diagram illustrating two schematic truncation methods, wherein a left diagram indicates a direct zero setting truncation method, and a right diagram indicates a zero setting and windowing method according to an embodiment of the present disclosure.

FIG. 8 is a schematic diagram illustrating two truncation methods, wherein a left diagram indicates a direct zero setting truncation method, and a right diagram indicates a zero setting and windowing method according to an embodiment of the present disclosure.

Referring to FIG. 8, in the method shown in the right diagram, 200 sample points are set to zero, and the remaining 248 sample points are windowed using Hamming window.

Figure 9:
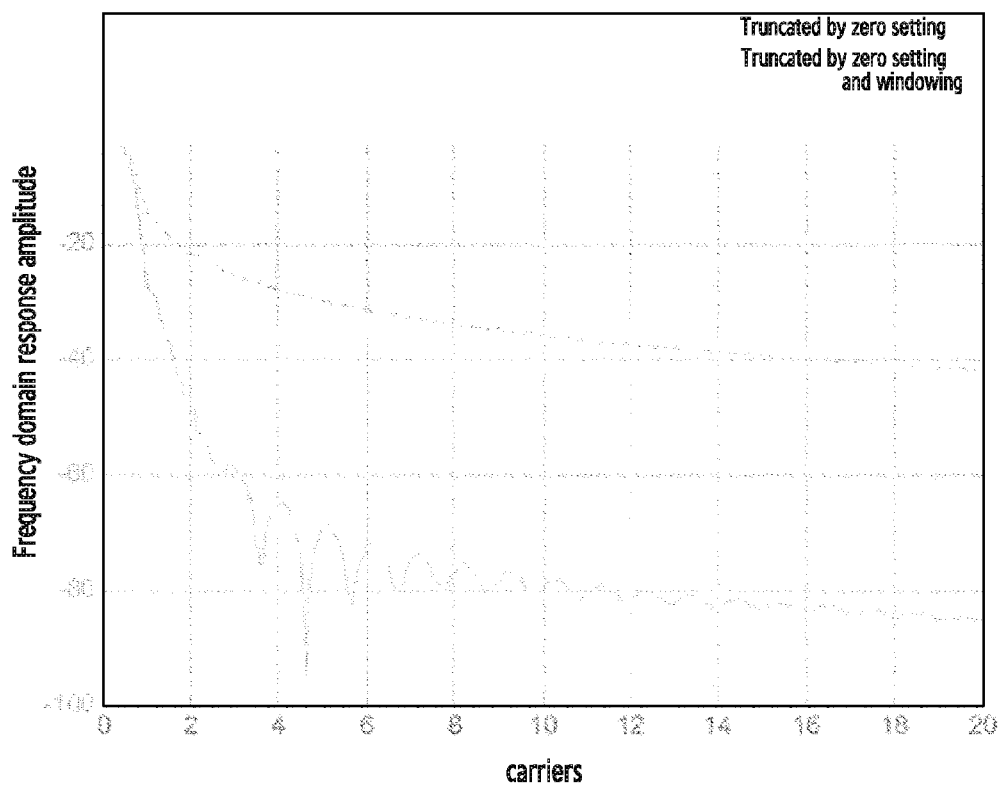
FIG. 9 is a schematic diagram illustrating a schematic frequency domain response of two truncation methods, wherein a left diagram indicates a direct zero setting truncation method, and a right diagram indicates a zero setting and windowing method according to an embodiment of the present disclosure.

In order to compare the effects or functions of the two truncation methods, FIG. 9 is a schematic diagram of frequency-domain response of the two truncation methods, wherein a left diagram indicates a direct zero setting truncation method, and a right diagram indicates a zero setting and windowing method according to an embodiment of the present disclosure.

Referring to FIG. 9, windowing to a part of the sample points may make the frequency-domain response of waveform rolling off quickly, so as to obtain improved frequency domain localization and reduce out of band leakage.

When the windowing method is used for truncation, it will be noted that a guard period (GP) needs to be arranged between two data blocks to avoid inter-block interference (IBI). Without considering the sampling error and channel delay, the minimum GP between two data blocks may be the number of sample points windowed, and the windowing areas of the two data blocks overlap.

Figure 10:
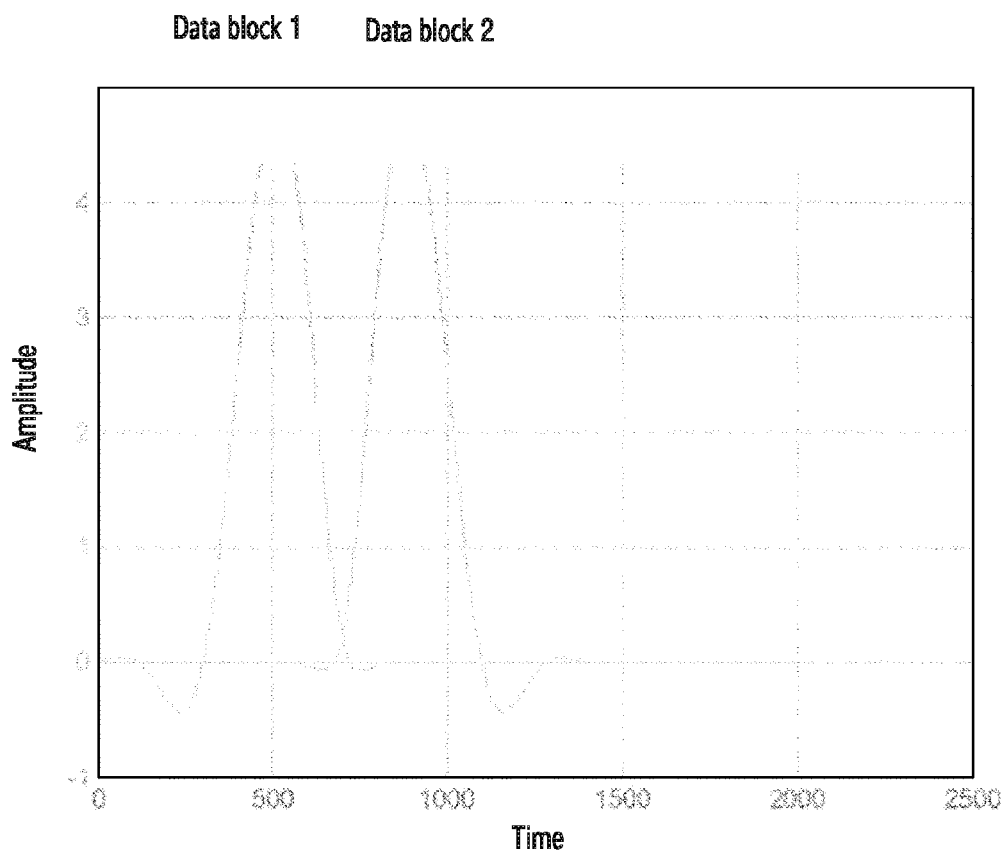
FIG. 10 is a schematic diagram illustrating overlapping between multiple data blocks when adopting truncation method with windowing according to an embodiment of the present disclosure.

FIG. 10 is a schematic diagram of overlapping among a plurality of data blocks when a windowing truncation is used according to an embodiment of the present disclosure.

Referring to FIG. 10, two data blocks (data blocks 1 and 2) have an overlap of 248 sample points which is equal to the number of sample points windowed. The sample points windowed will not be received at the receiving end since the sample points windowed belong to the truncation region, so that the receiving method is identical to the receiving method when the zero setting truncation method is used.

In a particular system, the zero setting truncation and windowing truncation may be jointly considered based on delay characteristics of channel, out of band leakage requirements and data block design requirements and other factors. Accordingly, in various embodiments of the present disclosure, a zero setting length and/or windowing length may be selected so that at least one of the following conditions is met: the adjacent channel leakage of the data block after truncation does not exceed a determined threshold, and the interference between the blocks of a plurality of data blocks from at least one user does not exceed a determined level.

For example, based on the embodiment 1, a data block configuration may be: one data block of 1 ms comprises 28 valid OQAM symbols, and uses 200 sample points for windowing, the guard interval between blocks is 256 sample points, and the windowed sample points may effectively suppress out of band leakage. The data block configuration has 56 sample points that are used to avoid interference between blocks due to channel delay and synchronization error. The sampling rate may be 3.84 MHz which is same with LTE.

In various embodiments of the present disclosure, the truncation length may be selected so that the length of the truncated data block is an integer unit. For example, the integer unit may be 1 ms, 5 ms, 10 ms, and the like.

Based on the above design, a data block may shorten the length of the data block, length of a data block may be shortened with a limited spectrum overhead and maintain an improved frequency domain localization. Such data block design may enhance a wireless communication system, particularly in case of uplink multi-user or a time division duplexing (TDD) system.

Figure 11:
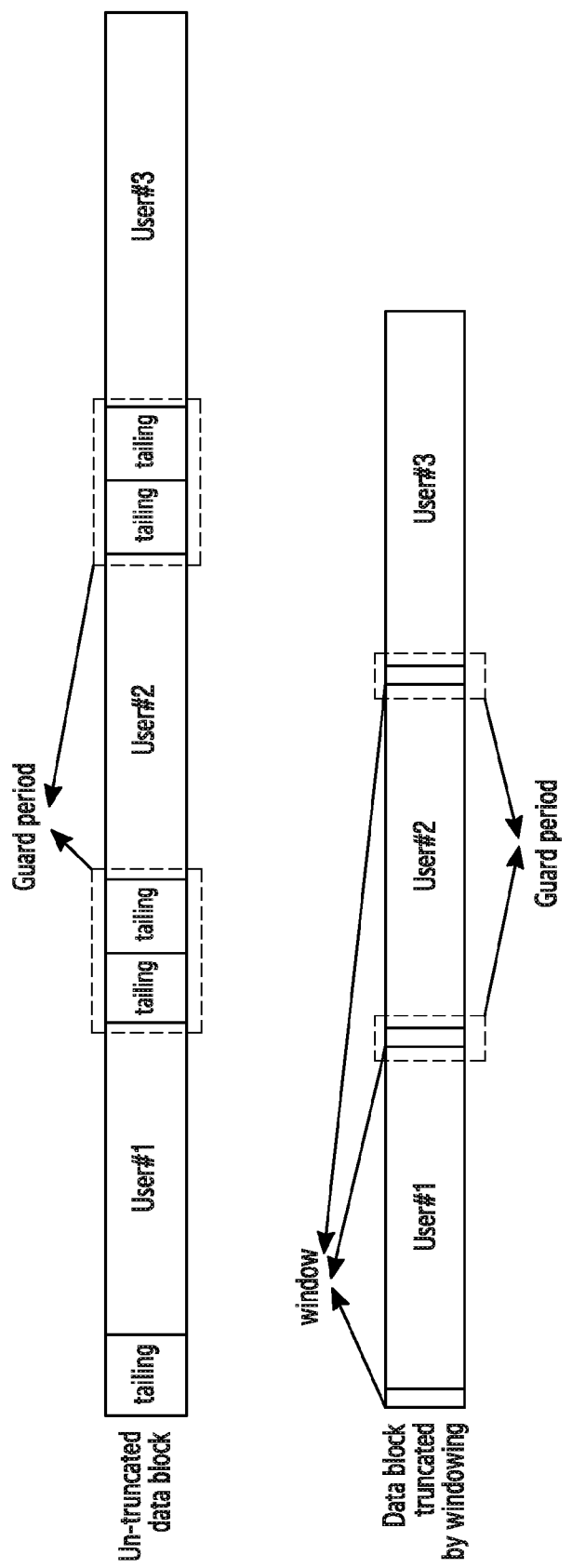
FIG. 11 is a schematic application in a multiuser uplink scenario according to an embodiment of the present disclosure.

FIG. 11 is a schematic application in a multi-user uplink scenario according to an embodiment of the present disclosure.

Referring to FIG. 11, the upper view is an un-truncated data block, and the lower view is a data block truncated through windowing according to the embodiment of the present disclosure. When multiple users transmit alternately, the guard interval set at both sides of the data block should be longer than the smearing of the both sides so as to avoid inter-block interference. The inter-block guard interval is reduced for a data block using a truncation method, so that the spectral efficiency is greatly improved. Therefore, a truncation method may improve spectrum utilization when being used in an uplink multi-user alternated transmission. An inter-block guard area is not needed if a plurality of data blocks of one user are scheduled consequentially, in other words, improvement of a truncated data block to spectrum efficiency is small in a case of continuous transmission of a single user.

Figure 12:
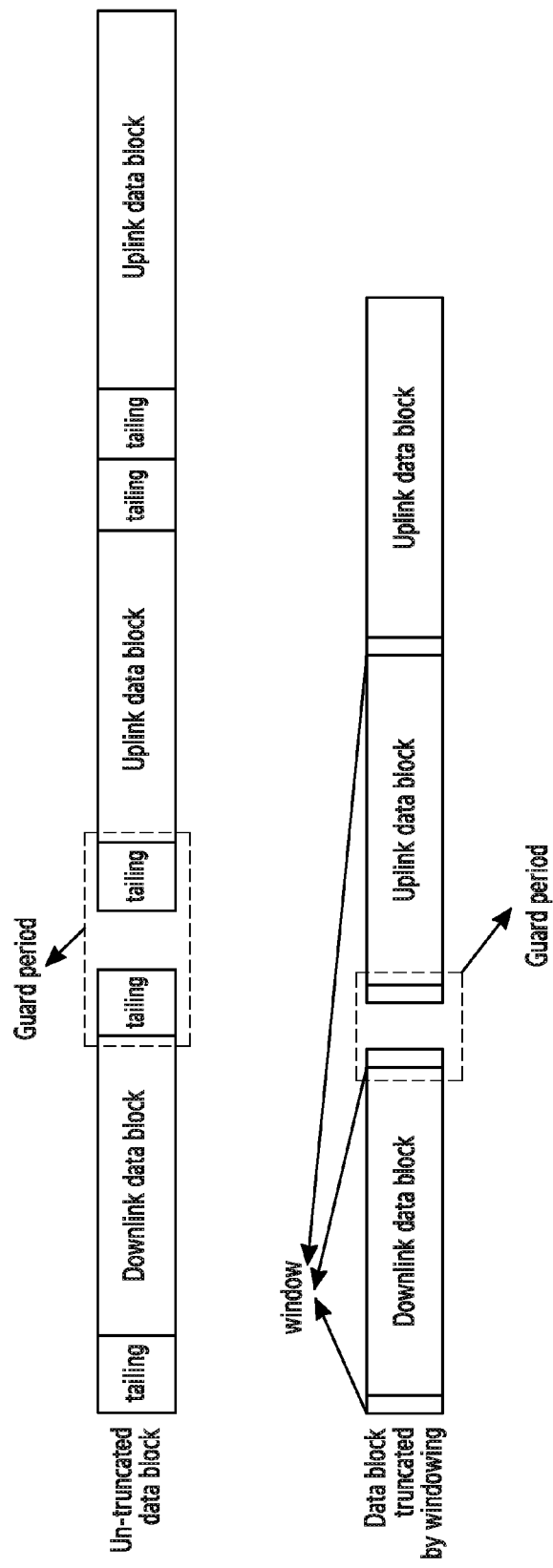
FIG. 12 is a schematic application in a time division duplexing (TDD) system according to an embodiment of the present disclosure.

FIG. 12 is a schematic diagram in a TDD system according to an embodiment of the present disclosure.

Referring to FIG. 12, the upper view is an un-truncated data block, and the lower view is a data block truncated through windowing according to the embodiment of the present application. In the TDD system, a guard period needs to be arranged for slot transition of downlink and uplink to avoid crosstalk between the downlink and uplink. Due to smearing, an un-truncated data block may lengthen the need for the guard period or guard interval, and thereby reducing the spectral efficiency. If a truncation method is used to an end symbol of a downlink data block and a front symbol of an uplink data block, the length of guard period of uplink and downlink may be shortened, and thereby improving the spectrum efficiency.

The above describes a method for transmitting signal based on a filter bank multi-carrier modulation provided in various embodiments according to the present disclosure in conjunction with the accompanying drawings. According to the embodiments provided herein, smearing due to a truncation may be effectively suppressed through preprocessing the symbols to be affected by the truncation prior to the truncation, so as to protect a good signal reception performance and spectral leakage characteristics, maximize the spectral efficiency of an FBMC system. Correspondingly, the present application also provides a corresponding signal receiving method.

Figure 13:
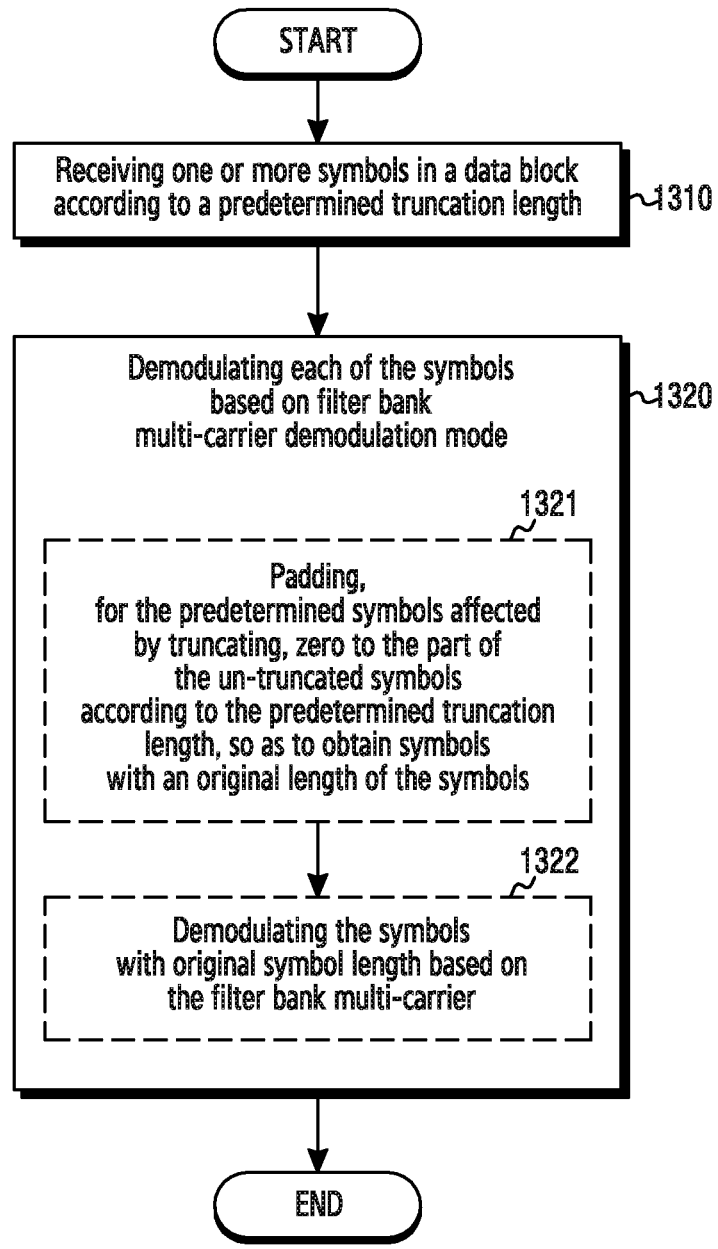
FIG. 13 is a flowchart illustrating a receiving method based on FBMC according to an embodiment of the present disclosure.

FIG. 13 is a flowchart of a method for transmitting signal based on a filter bank multi-carrier modulation in various embodiments according to an embodiment of the present disclosure.

Referring to FIG. 13, in operation 1310, at least one symbol in a data block are received according to a predefined truncation length.

At the receiving end, the signal reception may only receive valid data to avoid interference, since the transmitting end conducts truncation to the transmitted data block. The truncation length is predefined, so that the receiving end may only receive truncated data block in the precise time synchronization. In other words, only symbol which has not been truncated at the transmitting end are received or sampled when receiving or sampling determined symbol affected by truncation. For example, the transmitting end in embodiment 1 truncates 448 sample points on each side, and thereby the receiving may only need to receive 14×M=3584 sample points.

In operation 1320, each symbol is demodulated according to a demodulation mode based on a filter bank multi-carrier.

In an embodiment of the present disclosure, when a pre-coding is performed at a transmitting end, demodulating each symbol using a demodulation mode based on a filter bank multi-carrier may comprise an operation 1321 of padding, for the determined symbols affected by truncating, zero to the part of the un-truncated symbols according to the determined truncation length, so as to obtain symbols with an original length of the symbols, and an operation 1322 of demodulating the symbols with original symbol length based on the filter bank multi-carrier, i.e., the OQAM demodulation of the related art.

Since pre-coding has been performed at the transmitting end, the receiving end does not need additional processing, and the signal may be demodulated by the OQAM demodulation of the related art after zero padding.

When a zero setting truncation is used at the transmitting end, the received un-truncated symbols part may be padded with zero and demodulated by the above method. When a windowing truncation is used at the transmitting end, the windowed sample points are not received since they belongs to the truncated area, so that the receiving method may be identical to the receiving method when the zero setting truncation method is used.

In an embodiment of the present disclosure, when a preprocessing to a determined symbol at the transmitting end comprises selecting signal to be allocated to the determined symbol for different conditions of data blocks to be transmitted, a corresponding receiving method may be used according to the signal allocated to the determined symbol.

When preprocessing to a determined symbol is allocating a reference signal desired in a data block to a determined symbol to be affected by truncation, the receiving end may calculate a truncated reference signal vector and perform channel estimation based on the reference signal vector, since the original reference signal is a known signal and the ICI due to the truncation is also known, i.e., the interference matrix is known.

When preprocessing to a determined symbol is assigning channel that needs lower-order modulation mode in a data block to a determined symbol to be affected by truncation, the signal may be demodulated and received in a manner according to the related art, since the influence of truncation to demodulation of signal of lower-order modulated data block is negligible.

When a determined symbol processing comprises transmitting a retransmitted data block and allocating data included in un-determined symbols in an initially transmitted data block onto the determined symbols affected by truncation, the retransmitted signal and the original signal are soft-combined so that the data affected by truncation in a data block does not exist. Therefore, the receiving and demodulation may be performed in a manner according to the related art.

Figure 14:
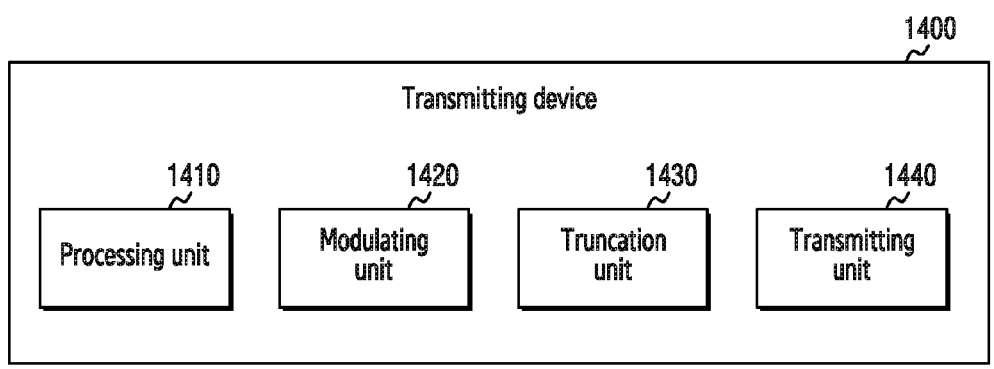
FIG. 14 is a schematic transmission device according to an embodiment of the present disclosure.

FIG. 14 is a schematic block diagram illustrating a transmitting device configured to implement an embodiment of the present disclosure according to an embodiment of the present disclosure.

Referring to FIG. 14, a transmitting device 1400 comprises a preprocessing unit 1410, a modulating unit 1420, a truncation unit 1430 and a transmitting unit 1440.

The preprocessing unit 1410 is configured to preprocess determined symbols in a data block comprising at least one symbol, wherein the determined symbols are symbols to be affected by the truncation.

In various embodiments of the present disclosure, the preprocessing unit 1410 is configured to pre-code the determined symbols. The pre-coding matrix used for the pre-coding may be determined according to the filter parameters used in the filter bank multi-carrier modulation and the parameters used in truncation.

In various embodiments of the present disclosure, the pre-processing unit 1410 is configured to allocate a reference signal required in the data block to the determined symbols.

In various embodiments of the present disclosure, the pre-processing unit 1410 is configured to assign channel that needs low-order modulation in the data block to the determined symbols.

In various embodiments of the present disclosure, the pre-processing unit 1410 is configured to allocate data on un-determined symbols in the initially transmitted data block to the determined symbols when the data block is retransmitted data block.

The modulating unit 1420 is configured to modulate the preprocessed data block with the filter bank multi-carrier modulation.

The truncation unit 1430 is configured to truncate the modulated data block to remove a part or all of tailing data therefrom.

In various embodiments of the present disclosure, the truncation unit 1430 is further configured to select a truncation length such that a length of the truncated data block satisfies one integer unit.

In various embodiments of the present disclosure, the truncation unit 1430 is configured to perform truncation through at least one of the following: setting the part or all of the tailing data into zero, and windowing the part or all of the tailing data. The zero setting length and/or windowing length may be selected so that at least one of the following is met: the adjacent channel leakage of the data block after truncation does not exceed a determined threshold, and the interference between the blocks of a plurality of data blocks from at least one user does not exceed a determined level.

The transmitting unit 1440 is configured to transmit the modulated data block after truncation.

It will be appreciated that various units and sub-units included in the transmitting device 1400 are configured to implement the embodiments disclosed herein. Therefore, the above operations and features described combining FIGS. 2-12 are also applicable to the transmitting device 1400 and the units/sub-units therein, and a detailed description thereof will be omitted herein.

Figure 15:
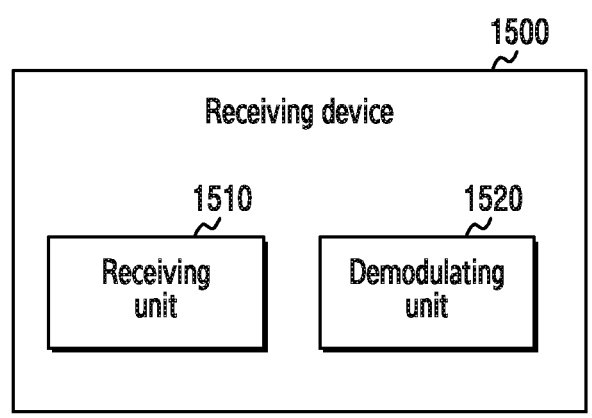
FIG. 15 is a schematic receiving device according to an embodiment of the present disclosure.

FIG. 15 is a schematic block diagram of a receiving device configured to implement an embodiment of the present disclosure according to an embodiment of the present disclosure.

Referring to FIG. 15, a receiving device 1500 comprises a receiving unit 1510 and a demodulating unit 1520.

The receiving unit 1510 is configured to receive at least one symbol in a data block. The receiving unit 1510 may be further configured to only receive or sample a part of symbols truncated at the transmitting end when a determined symbol affected by the truncation is received or sampled.

The demodulating unit 1520 is configured to demodulate each of the symbols based on filter bank multi-carrier demodulation mode.

In an embodiment of the present disclosure, when a pre-coding is performed at a transmitting end, the demodulating unit 1520 may be configured to pad, for the determined symbols affected by truncation, zero to the part of the un-truncated symbols according to the determined truncation length, so as to obtain symbols with an original length of the symbols, and demodulate the symbols with original symbol length based on the filter bank multi-carrier after zero padding, i.e., the OQAM demodulation according to the related art.

It will be appreciated that various units and sub-units included in the receiving device 1500 are configured to implement the embodiments disclosed herein. Therefore, the above operations and feathers described combining FIG. 13 are also applicable to the receiving device 1500 and the units/sub-units therein, and a detailed description thereof will be omitted herein.

The modules described in the embodiments according to the present disclosure can be implemented using certain hardware, software, or a combination thereof. In addition, the modules described herein may be implemented in a processor. For example, the modules may be described as a processor comprises a request receiving module, information reading module, a view building module and a function enabling module. The names of these modules in some cases do not intend to introduce any limitation to the modules themselves. For example, the request receiving module may also be described as "a module for receiving a request submitted by a user to call widgets".

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a transmitting device in a wireless communication system based on filter bank multi-carrier (FBMC) modulation, the method comprising:
   identifying at least one symbol in a data block based on a position of at least part of tailing data to which a truncation from the data block is to be applied;
   preprocessing the at least one symbol based on an inter-carrier interference (ICI) associated with the truncation;
   modulating the data block comprising the preprocessed at least one symbol based on the FBMC modulation;
   applying the truncation to the at least part of tailing data from the modulated data block; and
   transmitting the modulated data block from which the truncation to the at least part of tailing data is applied.

2. The method of claim 1, wherein the preprocessing of the at least one symbol comprises:
   pre-coding the at least one symbol.

3. The method of claim 2, wherein a pre-coding matrix used for the pre-coding of the at least one symbol is determined based on filter parameters used in the FBMC modulation and parameters used in the truncation of the at least part of tailing data.

4. The method of claim 3, wherein the parameters comprise a predetermined truncation length.

5. The method of claim 1, wherein the preprocessing of the at least one symbol comprises:
   allocating reference signals required in the data block onto the at least one symbol.

6. The method of claim 1, wherein the preprocessing of the at least one symbol comprises:
   allocating data included in un-determined symbols in an initial transmitting data block onto the at least one symbol.

7. The method of claim 1, wherein the applying of the truncation comprises at least one of:
   setting a part or all of the tailing data into zero; or
   windowing a part or all of the tailing data.

8. A method for operating a receiving device in a wireless communication system based on a filter bank multi-carrier (FBMC) modulation, the method comprising:
   receiving, from a transmitting device, a data block from which at least part of tailing data is truncated; and
   demodulating the data block based on an FBMC demodulation,
   wherein the data block includes at least one symbol which is preprocessed prior to the truncation of the at least part of tailing data by the transmitting device based on an inter-carrier interference (ICI) associated with the truncation, and
   wherein the at least one symbol is identified based on a position of the at least part of tailing data.

9. The method of claim 8, wherein the at least one symbol is pre-coded using a precoding matrix, or allocated with reference signals by the transmitting device.

10. The method of claim 8, wherein the demodulating of the at least one symbol comprises:
    padding, for the position of the at least part of tailing data truncated from the data block, with zero according to a predetermined truncation length, so as to obtain a data block with an original symbol length; and
    demodulating the data block with the original symbol length based on the FBMC mode.

11. A transmitting device comprising:
at least one processor configured to:
- identify at least one symbol in a data block based on a position of at least part of tailing data to which a truncation from the data block is to be applied;
- preprocess the at least one symbol based on an inter-carrier interference (ICI) associated with the truncation,
- modulate the data block comprising the preprocessed at least one symbol based on a filter bank multi-carrier (FBMC) modulation, and
- apply the truncation to the at least part of tailing data from the modulated data block; and at least one transceiver configured to transmit the modulated data block from which the truncation to the at least part of tailing data is applied.

12. The transmitting device of claim 11, wherein the at least one processor is further configured to pre-code the at least one symbol.

13. The transmitting device of claim 12, wherein a pre-coding matrix used for the pre-coding of the at least one symbol is determined based on filter parameters used in the FBMC modulation and parameters used in the truncation of the at least part of tailing data.

14. The transmitting device of claim 13, wherein the parameters comprise a predetermined truncation length.

15. The transmitting device of claim 11, wherein the at least one processor is further configured to allocate reference signals required in the data block onto the at least one symbol.

16. The transmitting device of claim 11, wherein the at least one processor is further configured to allocate data included in un-determined symbols in an initial transmitting data block onto the at least one symbol.

17. The transmitting device of claim 11, wherein the at least one processor is further configured to perform at least one operation of:
- setting a part or all of the tailing data into zero; or
- windowing a part or all of the tailing data.

18. A receiving device comprising:
at least one transceiver configured to receive, from a transmitting device, a data block from which at least part of tailing data is truncated; and
at least one processor configured to demodulate the data block based on a filter bank multi-carrier (FBMC) demodulation,
wherein the data block includes at least one symbol which is preprocessed prior to the truncation of the at least part of tailing data by the transmitting device based on an inter-carrier interference (ICI) associated with the truncation, and
wherein the at least one symbol is identified based on a position of the at least part of tailing data.

19. The receiving device of claim 18, wherein the at least one symbol is pre-coded using a precoding matrix, or allocated with reference signals by the transmitting device.

20. The receiving device of claim 19, wherein the at least one processor is further configured to:
- pad, for the position of the at least part of tailing data truncated from the data block, with zero according to a predetermined truncation length, so as to obtain a data block with an original symbol lengths; and
- demodulate the data block with the original symbol length based on the FBMC demodulation mode.

* * * * *